Figure 1:
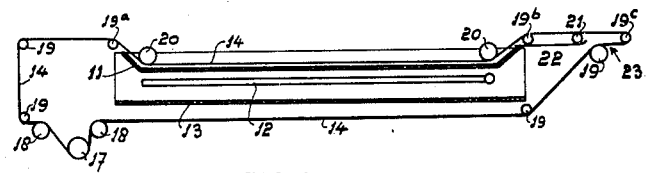

Oct. 13, 1964 T. K. DIETZ 3,152,537
APPARATUS FOR TREATING VICTUALS IN A HEATED LIQUID BATH
Filed Sept. 12, 1960

INVENTOR.
Tiddo Karel Dietz
BY
Watson, Cole, Grindle & Watson
Attorneys

United States Patent Office 3,152,537
Patented Oct. 13, 1964

---

3,152,537
APPARATUS FOR TREATING VICTUALS IN A
HEATED LIQUID BATH
Tiddo K. Dietz, 8 Prinsenhofsteeg,
Amsterdam, Netherlands
Filed Sept. 12, 1960, Ser. No. 55,513
Claims priority, application Netherlands Dec. 14, 1959
1 Claim. (Cl. 99—404)

The present invention relates to an apparatus for treating victuals in a heated liquid bath of the known type which is provided with a tank for the liquid, means for heating the contents of the tank, an endless belt conveyor for conveying the victuals to be treated through the liquid bath and means for driving and guiding the belt conveyor.

It should be noted that the term "liquid" must be regarded also to include substances which become liquid upon heating, such as fat, for instance.

It is a primary object of the invention to provide an apparatus of this type which is particularly suitable for treating peanuts, but which can also advantageously be used for baking or frying various other foodstuffs and luxuries such as "pommes frites," chips, nibbits, dough products, fish, poultry, etc.

It is another object of the invention to provide such an apparatus which is virtually fully automatic and which consequently requires a minimum of attendance.

Still another object of the invention is to provide an apparatus which in contradistinction to prior art apparatus of this type ensures that the duration of treatment of all parts of the commodity to be treated is substantially the same independently of their location in the layer on the belt conveyor. It is a correlative object to provide an apparatus which is capable of supplying a product which distinguishes itself by a uniform degree of cooking or baking and consequently by a uniform colour, thereby avoiding that part of the commodity subject to decay or deterioration of taste sooner than another portion.

Consequently, it is an object of the invention to provide an apparatus for treating victuals in a heated liquid bath in which all victuals to be treated irrespective of their position in the layer on the conveying means are substantially simultaneously immersed into and raised out of the liquid bath.

Yet another object of the invention is to provide an apparatus of the type set forth including means to prevent the victuals to be treated from sliding over the belt conveyor in or against the direction of travel thereof, either when entering into or when passing through or when emerging from the liquid bath.

Moreover, it is an object to provide an apparatus of the type described which is capable of rapidly removing from the victuals to be treated all moisture, fatty-acids and other ingredients which may have taste deteriorating effects on the product.

Generally, the invention provides an apparatus for treating victuals in a heated liquid bath, said apparatus comprising a tank for the liquid, means for heating the contents of the tank, an endless belt conveyor for conveying the victuals to be treated through the liquid bath and means for driving and guiding said belt conveyor, said latter named means being adapted to guide the belt conveyor steeply downwards into the tank at the inlet end and to guide it steeply upwards out of said tank at the outlet end thereof.

Figure 2:
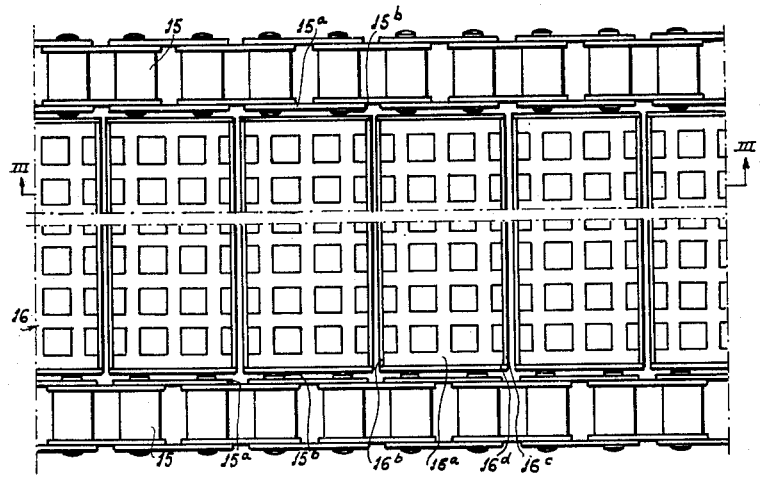
Figure 3:
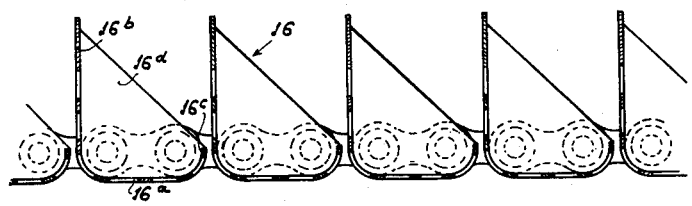

Other objects, features and advantages of the invention will become apparent as the description proceeds taken in conjunction with the accompanying drawings, in which:

FIG. 1 is a diagrammatic longitudinal cross-section and part side elevation of an apparatus according to the invention, FIG. 2 is a plan view on an enlarged scale of a portion of the belt conveyor, and FIG. 3 is a longitudinal cross-section also on an enlarged scale along the line III—III in FIG. 2 of a portion of the conveyor.

While the invention is susceptible of various modifications and alternative arrangements and constructions, there is shown in the drawing and will be described in detail a certain preferred embodiment. However, it is to be understood that it is not hereby intended to limit the invention to the embodiment disclosed, but it is instead intended to cover all modifications, equivalents, and alternatives falling within the spirit and scope of the invention as expressed in the appended claim.

The apparatus diagrammatically shown in FIG. 1 comprises a tank 11 for the treating liquid such as oil, a gas-burner 12 positioned underneath the tank for heating the contents of the tank and a screen 13 disposed thereunder; the supports for these various parts are not shown in the drawing.

Moreover, the apparatus is provided with an endless belt conveyor 14 for conveying the victuals to be treated through the liquid bath. This conveyor consists of two roller chains 15 with elements or trays 16 positioned therebetween and extending transversely to the direction of travel of the conveyor. In the preferred embodiment shown in the drawing these elements or trays have a perforated bottom 16$^a$, an upwardly extending longitudinal side wall 16$^b$ serving as a carrier means and an opposite longitudinal side wall 16$^c$ of considerably lesser height; the height of the latter side wall is approximately equal to half the height of the chain links. The joint between the bottom and the side walls of the elements 16 is formed by rounded portions, the arc of curvature also being approximately equal to half the height of the chain links. The elements or trays 16 have their end walls 16$^d$ secured to the outer links 15$^a$ facing one another or to the heads of the pins 15$^b$ of the chains 15. The particular shape of the elements 16 permit of bending the conveyor with a small arc of curvature without gaps of any significance being formed in the conveyor belt.

Preferably, the longitudinal side walls 16$^b$ and 16$^c$ are also perforated so as to avoid or at least reduce the creation of turbulences in the liquid and whirling up of pollutions. In order to reduce turbulence of the liquid one or more baffles (not shown) may be provided transversely of the direction of travel of the conveyor.

In an advantageous embodiment the bottom and the two longitudinal side walls of each tray or elements 16 are formed integrally by bending a strip of perforated sheet metal.

The apparatus according to the invention is also provided with means for driving and guiding the belt conveyor; such means comprise a pair of drive wheels or sprockets 17 the shaft of which is driven at a regulatable speed by a suitable motor (not shown). The chains are being kept under tension by means of two pairs of tensioning idlers 18 and are guided further around by means of a plurality of pairs of idlers 19. Two pairs of guide wheels 20 are positioned near the inlet and outlet ends of the tank 11 in such a way that they, in co-operation with the adjacent pairs of idlers 19$^a$ and 19$^b$, feed the belt conveyor steeply into and steeply out of the liquid bath in the tank 11. This ensures that all the commodities to be treated are subjected to the treatment in the liquid bath during the same period of time whatever their position on the belt conveyor may be, the more so since sliding of the commodities over the belt, be it on entering into or passing through or emerging out of the liquid bath is prevented, particularly by the higher upstanding longitudinal side walls 16$^b$ acting as carriers.

In the embodiment shown and described the belt conveyor travels from left to right in FIG. 1 through the liquid bath; at the outlet end a scraper roller 21 is provided which is rotated in an opposite direction, that is in an anti-clockwise direction, said roller removing oil dragged along from the under side of the trays 16 and, in co-operation with a baffle 22, returning it to the oil-bath.

The belt conveyor 14 is returned in the opposite direction by way of the guide wheels 19c at the extreme right of the apparatus; by the sharp bending caused thereby the longitudinal side walls 16b of the adjacent trays or elements 16 are moved away from one another as the elements of a fan, so that a complete discharge of the contents of said trays or elements is ensured. If desired a receiving or collecting means or a second conveyor for carrying the treated commodities off may be provided at that spot.

A vibrating device (not shown) may be positioned in or near the place indicated by 23 in order to set the belt conveyor into vibration to remove particles of the treated commodities carried along with the elements.

The guide wheels 20 are vertically adjustable so as to permit of the belt conveyor to be raised out of the tank 11, thereby providing a simple way to take the necessary steps when the oil gets polluted after some time of operation. For instance, these steps may consist in sliding the tank 11 out of the apparatus and substituting another tank containing fresh oil. Alternatively, the polluted oil might be purified by scooping the pollutions off with a suitable implement; the polluted oil might also be drained off and replaced by fresh oil. A similar effect may be obtained by mounting the tank so as to be vertically adjustable either alone or together with the burner 12.

What I claim is:

Apparatus for treating victuals in a heated liquid comprising a tank, means for heating said tank, an endless conveyor comprising a set of two parallel horizontally spaced endless chains, each composed of a series of chain links, and a plurality of adjacent parallel tray members, each having a perforated substantially flat bottom, extending transversely of said endless chains and disposed substantially in a plane with the bottom edge of said chains, the opposite ends of each of said tray members being connected respectively to said chains, each of said tray members having a first side wall extending transversely of said endless chains and substantially perpendicular to said flat bottom to a height substantially equal to half the height of the chain links and a second upstanding side wall of a height substantially higher than said first side wall, each of said higher walls being positioned contiguously parallel to said first side walls of adjacent trays such that said conveyor may be freely flexed both upwardly and downwardly, and means for driving and guiding the conveyor into the tank at one end thereof, through the tank, out of the tank at the other end thereof, and around the tank from the latter named end into the first named end.

References Cited in the file of this patent

UNITED STATES PATENTS

| | | |
|---|---|---|
| 727,271 | Blackmon | May 5, 1903 |
| 2,042,655 | Ferry | June 2, 1936 |
| 2,475,523 | Schroeder | July 5, 1949 |
| 2,478,302 | Moyer | Aug. 9, 1949 |
| 2,528,069 | McGihon | Oct. 31, 1950 |